United States Patent [19]

Murakami

[11] Patent Number: 5,204,919
[45] Date of Patent: Apr. 20, 1993

[54] METHOD OF AND APPARATUS FOR PERFORMING DETAIL ENHANCEMENT

[75] Inventor: Shigeo Murakami, Kyoto, Japan

[73] Assignee: Dainippon Screen Mfg. Co., Ltd., Japan

[21] Appl. No.: 468,598

[22] Filed: Jan. 23, 1990

[30] Foreign Application Priority Data

Jan. 30, 1989 [JP] Japan .................................. 1-22144

[51] Int. Cl.$^5$ ............................ G06K 9/40; H04N 5/14
[52] U.S. Cl. ...................................... 382/54; 358/447; 358/166
[58] Field of Search .................. 382/54; 358/447, 166

[56] References Cited

U.S. PATENT DOCUMENTS

| | | | |
|---|---|---|---|
| 4,317,179 | 2/1982 | Kato et al. | 358/447 |
| 4,335,407 | 6/1982 | Atoji et al. | 358/447 |
| 4,887,153 | 12/1989 | Uehara et al. | 358/42 |
| 5,001,573 | 3/1991 | Sakamoto et al. | 358/447 |

Primary Examiner—Leo H. Boudreau
Assistant Examiner—Chris Kelley
Attorney, Agent, or Firm—Ostrolenk, Faber, Gerb & Soffen

[57] ABSTRACT

Detail enhancement is performed through effectively intensifying an image signal component having a predetermined spatial frequency. Based on the size of an image to be reproduced, a standard observation distance between the image and an observer is computed. A spatial frequency to be intensified is found so that it corresponds to about 12 cpd at the standard observation distance. The size of a pixel area suitable in producing an unsharp signal (U) is set to be inversely proportional to the spatial frequency. Signals (U13–U15) for various pixel areas are prepared, and one of these signals which is obtained for the suitable pixel area is selected to be the unsharp signal (U). An enhanced image signal $(S+k(S-U))$ is produced on the basis of the unsharp signal and a sharp signal (S).

10 Claims, 7 Drawing Sheets

FIG.2(a) DENSITY OF ORIGINAL

FIG.2(b) SHARP SIGNAL S

FIG.2(c) UNSHARP SIGNAL U

FIG.2(d) DIFFERENTIAL SIGNAL k(S−U)

FIG.2(e) ENHANCED IMAGE SIGNAL S+k(S−U)

METHOD OF AND APPARATUS FOR PERFORMING DETAIL ENHANCEMENT

BACKGROUND OF THE INVENTION

1. Field of the Invention

The present invention relates to a method and an apparatus therefor for performing image detail enhancement.

2. Description of the Prior Art

The term sharpness in the field of image processing refers to the appearance of sharp edges and contours in an image. The sharpness is one of the important characteristics which influence the image quality, especially, the pleasantness of the visual effect.

It is well known in the art that intensifying the image signal component having a spatial frequency of about 12 cpd (cycle per degree) is crucial to the enhancement of the sharpness. This is described in Kenji Hiwatashi, "Image Engineering Handbook," (Asakura Shoten, 1986), page 25, for example. The unit "cpd" denotes a number of pairs of black and white patterns within a visual angle of one degree. Therefore, an image signal component having the spatial frequency of about 12 cpd represents an image which includes about 12 pairs of black and white patterns within a visual angle of one degree.

The spatial frequency will be expressed herein in cpd or 1 p/mm (line pairs per millimeter). The unit "1 p/mm" denotes the number of pairs of black and white patterns within one millimeter on an image. Spatial frequency expressed in cpd, which is measured by an observer of an image, will be referred to as "apparent spatial frequency". Spatial frequency expressed in 1 p/mm, which is measured on an image, will be referred to as "actual spatial frequency".

In reproducing an image, a sharp and visually pleasing image is reproduced by intensifying the image signal component having the apparent spatial frequency of about 12 cpd.

A distance measured on an image which corresponds to a visual angle of one degree becomes longer as a distance between the image and an observer increases. Therefore the actual spatial frequency of the image signal component having the apparent spatial frequency of about 12 cpd decreases as the distance between the image and the observer increases.

Usually, the image signal component having the apparent spatial frequency of about 12 cpd is intensified while the distance between an image and an observer is assumed to be that of distinct vision, which usually ranges from 25 cm to 30 cm. However, values of parameters specifying the detail enhancement depend on an apparatus, such as a scanner, with which the detail enhancement is performed. For example, some apparatus varies the image signal component to be intensified in response to a magnification factor in reproduction. Further, the image signal component to be intensified depends on an operator's taste.

However, not all reproduced images are viewed at the distance of distinct vision. A reproduced image used as a frontispiece or an illustration of a comparatively small book is usually seen at the distance of distinct vision. On the other hand, an image used as a large-sized poster, for example, is usually seen at a distance longer than that of distinct vision, typically one meter or so away therefrom. If an image signal component has an apparent spatial frequency of about 12 cpd when measured at a distance of 25 cm, its apparent spatial frequency will be 48 cpd when measured at a distance of one meter. When this image signal component is intensified and the reproduced image is observed at the distance of one meter, the reproduced image does not seem highly sharp. This is also the case with an apparatus which varies the image signal component to be intensified in response to the magnification factor.

As described above, the conventional methods and apparatuses intensify image signal components having the aforementioned apparent spatial frequency of about 12 cpd under particular conditions, such as the distance of distinct vision. Consequently, the enhancement processing does not adequately enhance the sharpness of the image when the reproduced image is not seen at the distance of distinct vision.

SUMMARY OF THE INVENTION

The present invention is directed to a method and an apparatus therefor for performing detail enhancement on an image signal representing an original image to thereby produce an enhanced image signal, and comprises the steps of: (a) determining a dimension of an image-to-be-reproduced, (b) computing a standard observation distance between an observer and the image-to-be-reproduced on the basis of the determined dimension, (c) finding a target spatial frequency to be intensified on the basis of the standard observation distance, the spatial frequency being defined on the image-to-be-reproduced, and (d) performing detail enhancement on the image signal while intensifying a signal component of the target spatial frequency.

According to one aspect of the present invention, the step (d) comprises the steps of: (d-1) producing a sharp signal representing the density of each pixel on the original image and an unsharp signal representing the average density of an averaging area larger than a pixel, (d-2) obtaining a first differential signal between the sharp signal and the unsharp signal, and multiplying the first differential signal by a coefficient to produce a second differential signal, and (d-3) adding the sharp signal and the second differential signal to produce the enhanced image signal.

According to another aspect of the present invention, the step (c) comprises determining the dimension of the averaging area so that it is inversely proportional to the target spatial frequency.

According to still another aspect of the present invention, the standard observation distance is computed so as to make a visual angle in a direction of a comparatively long side of the image-to-be-reproduced about 50 degrees.

According to another aspect of the present invention, the target spatial frequency corresponds to about 12 cycles per degree.

The unsharp signal may be produced in an analog circuit and the averaging area may correspond to an aperture for transmitting light to be converted into the unsharp signal. The size of the aperture is substantially variable. Alternatively, the unsharp signal may be produced in a digital circuit on the basis of the sharp signal, the averaging area may be formed as a pixel matrix, and the size of the pixel matrix may be variable.

Accordingly, a key object of the present invention is to provide a method and apparatus for an image signal component which affects the sharpness of an image, thereby producing a sharp and visually pleasing image.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 3(1)-3(4) schematically illustrate MTF characteristics of the image signals shown in FIG. 2;

DESCRIPTION OF THE PREFERRED EMBODIMENTS

In general, an enhanced image signal is produced on the basis of a sharp signal representing the density of each pixel in an image and an unsharp signal representing the average density of a larger area around each pixel. Firstly, a relationship existing between the unsharp signal and the image signal component to be enhanced will be described and explained.

Figure 1:
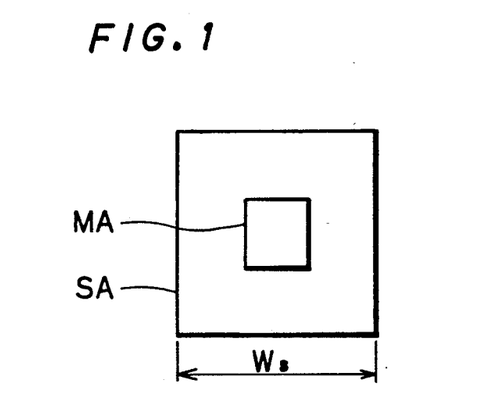
FIG. 1 illustrates apertures employed in detail enhancement in an analog circuit.
Figures 2A, 2B, 2C, 2D, 2E:
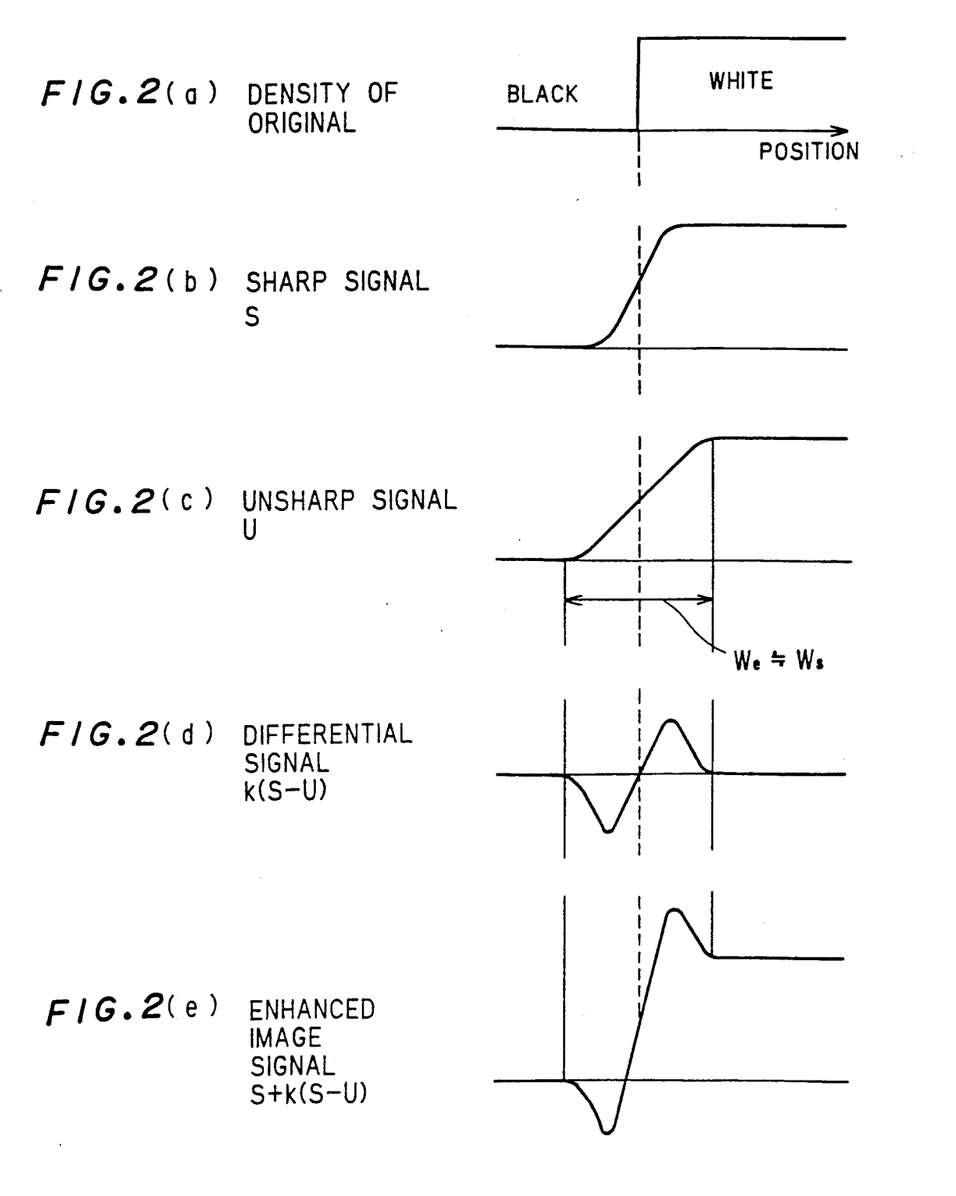
FIGS. 2(a)-2(e) are diagrams showing image signals concerning detail enhancement.
Figure 3:
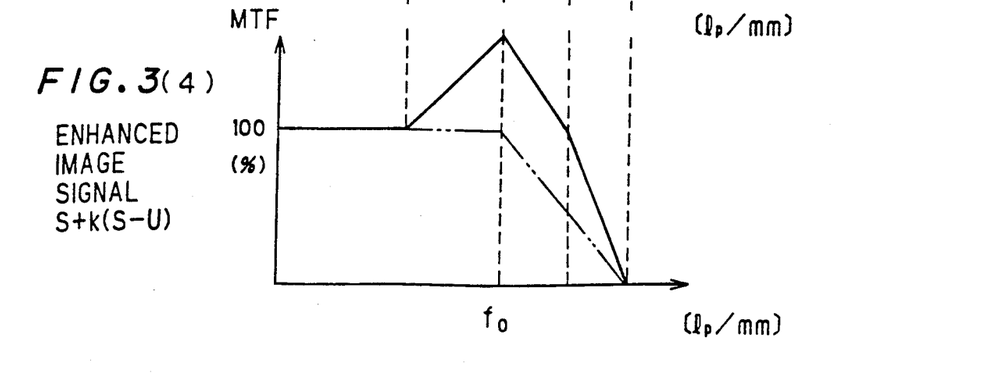

In an analog circuit, the characteristics of the unsharp signal depends on the size of an aperture employed for producing the unsharp signal. FIG. 1 illustrates a main aperture MA for the sharp signal and a sub-aperture SA for the unsharp signal. The sub-aperture SA is generally larger than the main aperture MA. FIG. 2 is a graph showing image signals concerning the detail enhancement in an analog circuit. FIG. 2(a) shows the density distribution of an original. The original has a sharp tone change from black to white at the center. By scanning the original, the sharp signal S shown in FIG. 2(b) is produced from light transmitted through the main aperture MA, and the unsharp signal U shown in FIG. 2(c) is produced from light transmitting through the sub-aperture SA. FIG. 2(d) shows a differential signal k(S−U) produced from the sharp signal S and the unsharp signal U, where k is a constant. An enhanced image signal S+k(S−U) shown in FIG. 2(e) is obtained by adding the differential signal to the sharp signal. A width We of detail enhancement where the level of the unsharp signal U is changing is nearly equal to a width Ws of the sub-aperture SA shown in FIG. 1. The levels of the differential signal and the enhanced image signal are also changing in the interval We of the detail enhancement. Assuming that the differential signal k(S−U) has a sinusoidal waveform, the width We (or Ws) corresponds to its period of $2\pi$. Therefore the actual spatial frequency represented by the differential signal k(S−U) is equal to 1/Ws. Accordingly, the image signal component having the actual spatial frequency of 1/Ws is most effectively intensified with the sub-aperture SA.

FIG. 3 is a graph schematically showing MTF (Modulation Transfer Function) characteristics of the sharp signal S, the unsharp signal U, the differential signal k(S−U), and the enhanced image signal s+k(S−U). An actual spatial frequency $f_0$ shown in FIG. 3(4), at which the image is most effectively enhanced, is equal to 1/Ws:

$$f_0 = 1/Ws \qquad (1)$$

As described above, the actual spatial frequency $f_0$ at which an image is most effectively enhanced depends on the size of the sub-aperture SA. On the other hand, the apparent spatial frequency at which an image is most effectively enhanced depends on the distance between a reproduced image and an observer as well. The relationship between the actual spatial frequency $f_0$ and the apparent spatial frequency $f_a$ of 12 cpd is given by the following equation:

$$\begin{aligned} f_0 &= f_a/\{L \times \tan 1^\circ\} \\ &= 12/\{L \times \tan 1^\circ\} \ [lp/mm] \end{aligned} \qquad (2)$$

where L is the distance between the reproduced image and the observer in units of mm.

Accordingly, the image signal component having the apparent spatial frequency $f_a$ of 12 cpd can be effectively intensified by adjusting the width Ws of the sub-aperture SA in response to the distance L, while maintaining the size of the main aperture MA. The width Ws of the sub-aperture SA is computed by the equations (1) and (2), when the distance L is fixed. For example, if the distance L is 450 mm, the actual spatial frequency $f_0$ is 1.5 lp/mm according to the equation (2), and the width Ws is 0.66 mm according to the equation (1). A method for determining the distance L will be described later.

A scanner can usually magnify an image by a desired magnification factor M. In this case, the width of the sub-aperture SA is multiplied by the reciprocal 1/M of the magnification factor to intensity the image signal component having the apparent spatial frequency $f_a$. Assuming that the dimension of the sub-aperture is W1×W2 in a main scanning direction and a subscanning direction, respectively, when the magnification factor M is 1.0, and that desired magnification factors are M1 and M2 in the main scanning and subscanning directions, respectively, a desired dimension of the sub-aperture becomes W1/M1×W2/M2.

Figure 4:
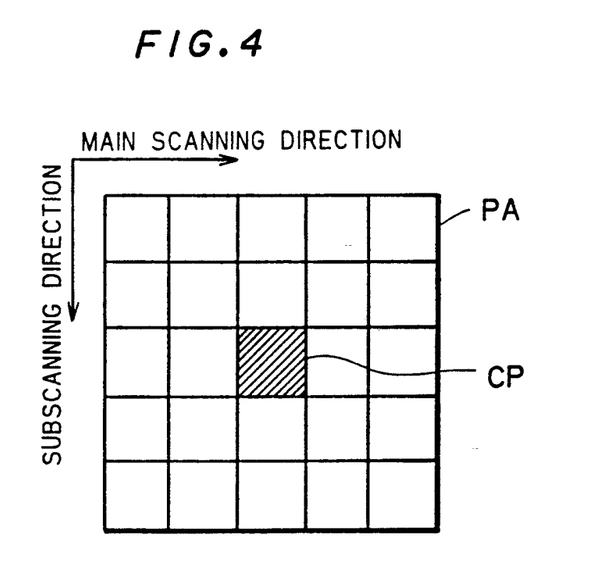
FIG. 4 illustrates a pixel area employed in detail enhancement in a digital circuit.

In a digital circuit, the unsharp signal is obtained by averaging sharp signals for a prescribed pixel area. FIG. 4 illustrates an example of the pixel area PA for the averaging procedure. The pixel area PA is usually a pixel matrix. When an original is scanned and an image signal is obtained, the image signal for the central pixel CP in the pixel area PA is used as the sharp signal S. The unsharp signal U is obtained by averaging the image signals for all the pixels in the pixel area PA. The differential signal k(S−U) is produced from the sharp signal S and the unsharp signal U. Finally, the enhanced image signal is produced by adding the differential signal to the sharp signal.

In the same manner as in the analog circuit, the image signal component having the apparent spatial frequency of 12 cpd can be effectively intensified by adjusting the width Ws of the pixel area PA according to the equations (1) and (2). If the desired width Ws of the sub-aperture is 0.66 mm, as described before, and if the dimension of one pixel is 50 μm × 50 μm, the pixel area PA is formed as a 13 × 13 pixel matrix (because 0.66 divided by 0.05 is almost equal to 13).

According to the equations (1) and (2), the desired width Ws of the sub-aperture SA can be calculated if the distance L is fixed. In the present invention, the distance L is estimated as a standard observation distance at which an observer feels comfortable to observe the reproduced image. Generally, the larger the reproduced image, the farther the observer stands from the reproduced image. The observer may behave unconsciously, but not arbitrarily. The behavior is subject to human nature and a tendency to act in certain ways which shall be referred herein as the "natural law".

The present invention defines the natural law by means of a certain equation and estimates the standard observation distance according to the natural law.

"Fundamental Parameters and Standards of HDTV" by T. Mitsuhashi, Journal of the Institute of Television Engineers of Japan, Vol. 42, No. 7, pp 742-750, 1988 describes a method of estimating the standard observation distance as follows: An observer feels comfortable to observe an image of proper resolution at a distance two or three times as long as the height of the image. This makes the angle of view 20 or 30 degrees. When the distance is shorter, the observer feels oppressed, uncomfortable and hardly looks at the whole image at once; thus the observer feels less comfortable. This is a result of an experiment concerning High Definition Television (or HDTV), where a ratio of horizontal to vertical length is about 3:5. In this experiment, if the distance is two times the height of the image, the angle of view is about 30 degrees in the vertical direction, and about 50 degrees in the horizontal direction.

In this embodiment, the standard observation distance is estimated to be one which makes the angle of view in a direction of the comparatively long side of the image about 50 degrees. The relationship between the standard observation distance L and the length Li of the longer side of the image is as follows:

$$L = Li/\{2 \cdot \tan(50°/2)\} \quad (3)$$
$$= Li/\{2 \cdot \tan 25°\}$$

For example, if the dimension of the image is 30 cm × 21 cm, the standard observation distance L is calculated to be about 32 cm by substituting 30 cm for Li in the equation (3). The estimation of the standard observation distance matches ordinary experience.

Figure 5:
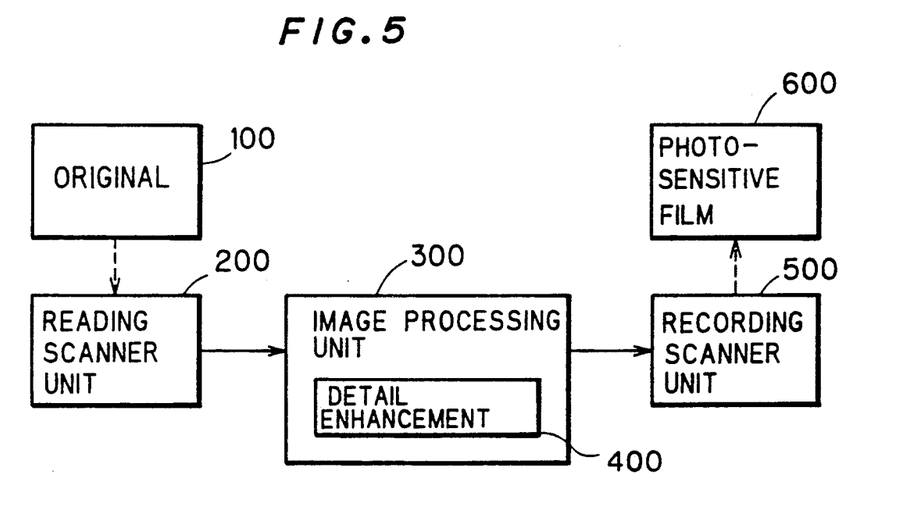
FIG. 5 is a block diagram showing the structure of a scanner system employed in a preferred embodiment of the present invention.

FIG. 5 is a block diagram showing the structure of a scanner system employed in a preferred embodiment of the present invention. A reading scanner unit 200 reads each pixel of an original 100 to obtain an image signal. The image signal is supplied to an image processing unit 300. The image processing unit 300 comprises a detail enhancement unit 400 to perform the detail enhancement on the given image signal. The function of the detail enhancement unit 400 will be described later in detail. The image signal processed in the image processing unit 300 is supplied to a recording scanner unit 500. The recording scanner unit 500 converts the image signal into a halftone dot signal and exposes a photosensitive film 600 according to the halftone dot signal to record a halftone image.

Figure 6:
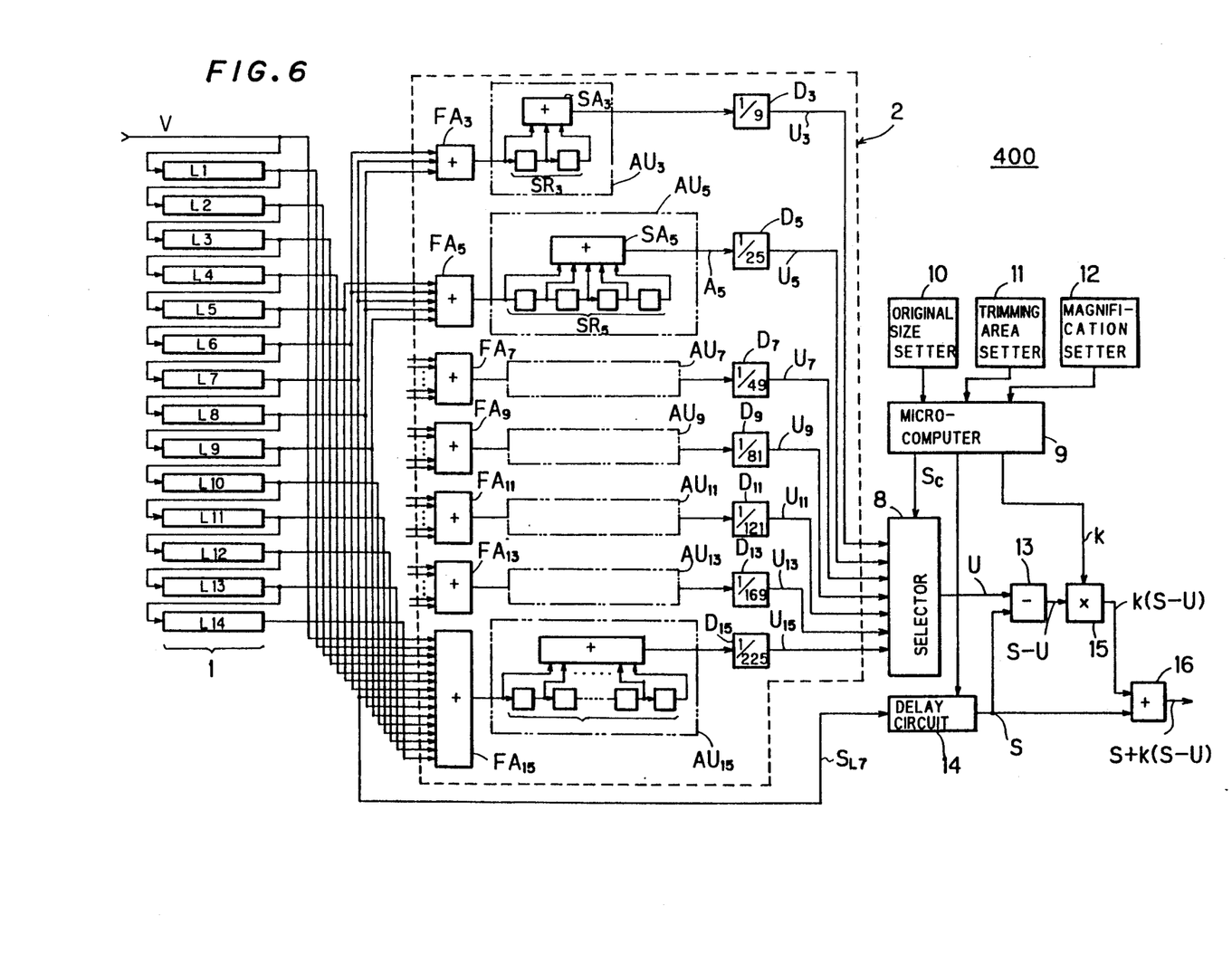
FIG. 6 is a block diagram showing the internal structure of a detail enhancement unit according to the preferred embodiment of the present invention.

FIG. 6 is a block diagram showing the internal structure of the detail enhancement unit 400 constructed as a digital circuit. The detail enhancement unit 400 comprises a line memory unit 1 and an averaging unit 2, which cooperatively produce various types of unsharp signals described below. The line memory unit 1 consists of fourteen line memories L1-L14, which are connected in series. A digital image signal V is supplied first to the line memory L1 and thence transmitted to the following line memories L2-L14. The digital image signal V is delayed for a duration corresponding to one scanning line in each of the line memories L1-L14. Output signals of the line memories L1-L14 as well as the undelayed image signal V therefore represent fifteen consecutive scanning lines in the original image. The output signal of the line memory L7 is an image signal representing the central line of the fifteen scanning lines.

The averaging unit 2 produces seven types of unsharp signals through averaging the image signal V in seven types of pixel areas, which are formed as pixel matrices of 3×3, 5×5, 7×7, 9×9, 11×11, 13×13 and 15×15, respectively. The averaging unit 2 comprises adders $FA_i$, adder units $AU_i$, and dividers $D_i$. Subscripts i of the symbols $FA_i$, $AU_i$, and $D_i$ in FIG. 6 denote the sizes of the matrices. For example, the adder $FA_3$, the adder unit $AU_3$ and the divider $D_3$ are circuits for averaging the image signal V in the 3×3 pixel matrix. In other words, the output signal of the divider $D_3$ is an unsharp signal representing average density in the 3×3 pixel matrix. Each adder FA receives some of the undelayed signal V and the output signals of the line memories L1-L14 and performs averaging processing in a sub-scanning direction. Each adder unit $AU_i$ receives the output signal of the corresponding adder $FA_i$ and performs averaging processing in a main scanning direction. The dividers $D_i$ divide the output signals of the corresponding adder units $AU_i$ by respective predetermined numbers.

The processing performed in the averaging unit 2 will be explained concerning the pixel area of 5×5 matrix.

The adder $FA_5$ receives output signals from the five line memories L5-L9 including the central line memory L7. The output signals from the line memories L5-L9 represent five consecutive scanning lines arrayed in the subscanning direction. An output signal from the adder $FA_5$ is supplied to four shift registers $SR_5$, which are connected in series, provided in the adder unit $AU_5$, and delayed for a duration corresponding to one pixel in each of the four shift registers $SR_5$. Output signals from the four shift registers $SR_5$ as well as the output signal from the adder $FA_5$ are supplied in parallel to an adder $SA_5$ to be added together. Consequently, the adder $SA_5$ substantially adds up the image signal V in the 5×5 pixel area. The added signal $A_5$ is supplied from the adder $SA_5$ to the divider $D_5$. The divider $D_5$ decides the added signal $A_5$ by 25, which is the number of pixels in the 5×5 pixel matrix, thereby producing an unsharp signal $U_5$ representing average density in the 5×5 pixel area. In the same manner, the dividers $D_3$, $D_7$, $D_9$, $D_{11}$, $D_{13}$ and $D_{15}$ output unsharp signals $U_3$, $U_7$, $U_9$, $U_{11}$, $U_{13}$ and $U_{15}$, respectively.

These unsharp signals $U_3$, $U_5$, $U_7$, $U_9$, $U_{11}$, $U_{13}$ and $U_{15}$ are supplied from the averaging unit 2 to a selector 8. The selector 8 selects one of the unsharp signals in response to a control signal Sc supplied from a microcomputer 9.

Figure 7:
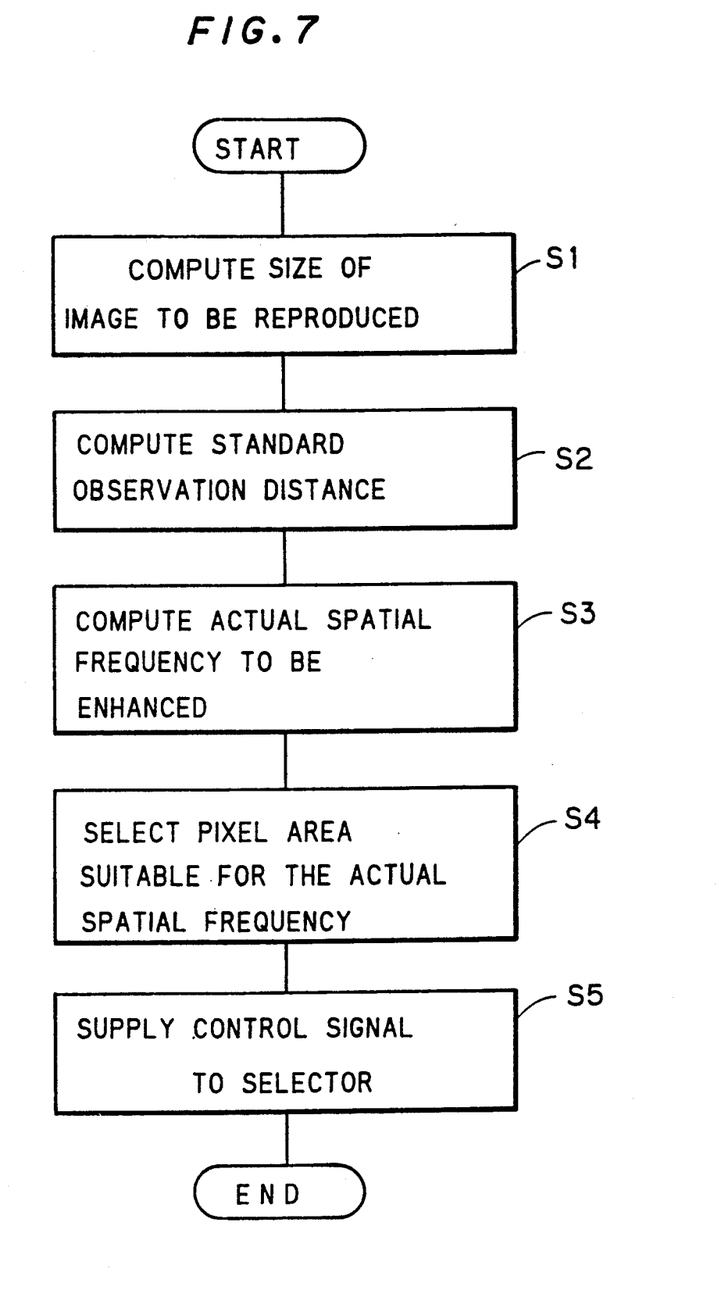
FIG. 7 is a flow chart according to the preferred embodiment of the present invention.

FIG. 7 is a flow chart showing the procedure for selecting one of the unsharp signals.

At a step S1, the size of an image to be reproduced is computed in the microcomputer 9 on the basis of reproduction conditions. The reproduction conditions comprises the size of an original, a trimming area (or an area to be reproduced) in the original, and a magnification factor. An operator inputs data of the size of the original in an original size setter 10, the trimming area in an trimming area setter 11, and the magnification factor in an magnification factor setter 12 in advance. The microcomputer 9 receives these reproduction conditions and computes the size of the image to be reproduced. Or, the size itself of the image to be reproduced may be inputted into the microcomputer 19.

At a step S2, the standard observation distance L between the reproduced image and an observer is computed on the basis of the size of the image to be reproduced according to the equation (3).

At a step S3, the actual spatial frequency $f_0$ corresponding to the apparent spatial frequency of 12 cpd is computed by substituting the value of the standard observation distance L in the equation (2).

At a step S4, one of the seven pixel areas is selected which is suitable for the actual spatial frequency $f_0$ computed at the step S3. First, the width of the suitable pixel area is calculated by the equation (1). Second, a pixel area whose side length is closest to the value of $1/f_0$ is selected from the seven pixel areas described before. If the dimension of one pixel is 50 $\mu$m $\times$ 50 $\mu$m, the pixel area to be selected is as follows:

when $1/f_0 < 0.2$: $3 \times 3$ pixel area;

when $0.2 \leq 1/f_0 < 0.3$: $5 \times 5$ pixel area;

when $0.3 \leq 1/f_0 < 0.4$: $7 \times 7$ pixel area;

when $0.4 \leq 1/f_0 < 0.5$: $9 \times 9$ pixel area;

when $0.5 \leq 1/f_0 < 0.6$: $11 \times 11$ pixel area;

when $0.6 \leq 1/f_0 < 0.7$: $13 \times 13$ pixel area; and when $0.7 \leq 1/f_0$: $15 \times 15$ pixel area.

When the magnification processing is performed after the detail enhancement processing, the apparent spatial frequency to be intensified is changed by the magnification processing. Therefore the width $Ws = 1/f_0$ of the pixel area is multiplied by the reciprocal of the magnification factor M, as described before. In other words, when the magnification processing is to be performed after the detail enhancement processing, a pixel area whose side has a length of $1/(f_0 \cdot M)$ is selected. On the other hand, when the magnification processing is performed before the detail enhancement processing, a pixel area whose side has a length of $1/f_0$ is selected.

The magnification processing can be performed in an analog circuit or in a digital circuit. Examples of the magnification processing procedures are described in Japanese Patent Publishing Gazettes No. 44-23651 and No. 60-37464, for example.

At the step S5, the microcomputer 9 supplies the control signal Sc designating the selected pixel area to the selector 8. The selector 8 selects one of the seven unsharp signals which corresponds to the selected pixel area.

The selected unsharp signal U is supplied from the selector 8 to a subtracter 13. Meanwhile, the output signal $S_{L7}$ of the central line memory L7 is delayed so as to synchronize it with the selected unsharp signal U in a delay circuit 14, to thereby become the sharp signal S. The delay time in the delay circuit 14 is controlled by the microcomputer 9. The sharp signal S is supplied to both the subtracter 13 and an adder 16. The subtracter 13 produces a differential signal (S−U). The differential signal (S−U) is multiplied by a coefficient k in a multiplication circuit 15 and then supplied to the adder 16. The adder 16 adds the sharp signal S to the differential signal k(S−U) to produce the enhanced image signal.

As described above, the width We of the detail enhancement is changed in response to the size of an image to be reproduced. Accordingly, visually pleasant, sharp image can be produced by the detail enhancement procedure.

In the above embodiment, the width of the pixel area is calculated by the equations (1) through (3). Instead, a table expressing the relationship between the sizes of a plurality of images and the widths of the suitable pixel areas may be prepared in advance, and one of the widths may be directly selected according to the table in response to the size of an image to be reproduced which is calculated under the reproduction conditions.

Figure 8:
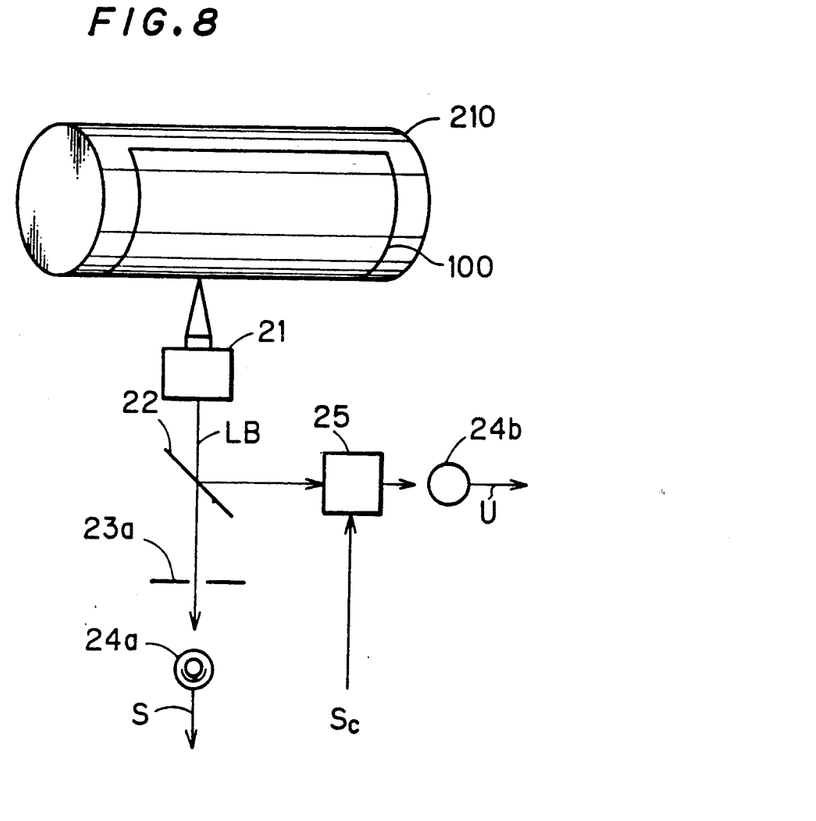
FIG. 8 is a diagram showing the structure of a reading scanner unit according to another preferred embodiment of the present invention.

The desired unsharp signal U for intensifying the apparent spatial frequency of 12 cpd can be obtained in an analog circuit as follows. FIG. 8 illustrates the structure of an optical reading system in the reading scanner unit 200 which produces the desired unsharp signal U. The original 100 wound around a reading drum 210 is read by a pick-up head 21. A portion of light LB including image information is transmitted through a half mirror 22 and a mask 23a for the sharp signal to be received by a photo multiplier 24a. The photomultiplier 24a converts the light LB into the sharp signal S. The other part of the light LB reflected by the half mirror 22 transmitted through an aperture unit 25 to be received by another photomultiplier 24b, to be converted into the unsharp signal U.

When the optical reading system is constructed as shown in FIG. 8, the line memories L1–L14, the averaging unit 2, the selector 8 and the delay circuit 14 shown in FIG. 6 are omitted. In this case, the control signal Sc is supplied from the microcomputer 9 to the aperture unit 25. The aperture unit 25 comprises a plurality of sub-apertures whose sizes are different from each other. In response to the control signal Sc representing the width of the desired sub-aperture, one sub-aperture is mechanically selected in the aperture unit 25. Or the aperture unit 25 may substantially vary the size of the sub-aperture by optically changing the cross section of the transmitting light while actually maintaining the size of the sub-aperture. An example of the structure and operation of the aperture unit 25 is described in U.S. Pat. No. 4,521,812 to Knop, for example.

According to the present invention, an actual spatial frequency to be intensified is changed in response to the size of an image to be reproduced. Therefore the width of the detail enhancement is made proper and a sharp and visually pleasant image is reproduced.

Although the present invention has been described and illustrated in detail, it is to be clearly understood that the same is by way of illustration and example only and is not to be taken by way of limitation. The spirit and scope of the present invention should be limited only by the terms of the appended claims.

What is claimed is:

1. A method of performing detail enhancement on an image signal representing an original image to thereby produce an enhanced image signal, comprising the steps of:

(a) determining a dimension of an image-to-be-reproduced, (b) computing a standard observation distance between an observation point and said image-to-be-reproduced on the basis of said dimension, (c) finding a target spatial frequency to be intensified on the basis of said standard observation distance, said spatial frequency being defined on said image-to-be-reproduced, and (d) performing detail enhancement on said image signal while intensifying a signal component of said target spatial frequency, said step (d) comprising the steps of:

(d-1) producing a sharp signal representing density of each pixel on said original image and an unsharp signal representing an average density of an averaging area larger than a pixel, (d-2) obtaining a first differential signal between said sharp signal and said unsharp signal, and multiplying said first differential signal by a coefficient to produce a second differential signal, and (d-3) adding said sharp signal and said second differential signal to produce said enhanced image signal, said step (c) comprising the step of determining a dimension of said averaging area such that it be inversely proportional to said target spatial frequency.

2. A method in accordance with claim 1, wherein said standard observation distance is computed so as to make a visual angle in a direction of a comparatively long side of said image-to-be-reproduced about 50 degrees.

3. A method in accordance with claim 2, wherein said target spatial frequency corresponds to about 12 cycles per degree.

4. A method in accordance with claim 3, wherein said unsharp signal is produced in an analog circuit, said averaging area corresponds to an aperture for transmitting light to be converted into said unsharp signal, and the size of said aperture is substantially variable.

5. A method in accordance with claim 3, wherein said unsharp signal is produced in a digital circuit on the basis of said sharp signal, said averaging area is formed as a pixel matrix, and the size of said pixel matrix is variable.

6. An apparatus for performing detail enhancement on an image signal representing an original image to thereby produce an enhanced image signal, comprising:

(a) means for determining a dimension of an image-to-be-reproduced, (b) means for computing a standard observation distance between an observation point and said image-to-be-reproduced on the basis of said dimension, (c) frequency setting means for finding a target spatial frequency to be intensified on the basis of said standard observation distance, said spatial frequency being defined on said image-to-be-reproduced, and (d) enhancing means for performing detail enhancement on said image signal while intensifying a signal component of said target spatial frequency, said enhancing means comprising:

(d-1) means for producing a sharp signal representing density of each pixel on said original image and an unsharp signal representing average density of an averaging area larger than a pixel, (d-2) means for obtaining a first differential signal between said sharp signal and said unsharp signal, and multiplying said first differential signal by a coefficient to produce a second differential signal, and (d-3) means for adding said sharp signal and said second differential signal to produce said enhanced image signal, said frequency setting means comprising means for determining a dimension of said averaging area such that it be inversely proportional to said target spatial frequency.

7. An apparatus in accordance with claim 6, wherein said standard observation distance is computed so as to make a visual angle in a direction of a comparatively long side of said image-to-be-reproduced about 50 degrees.

8. An apparatus in accordance with claim 7, wherein said target spatial frequency corresponds to about 12 cycles per degree.

9. An apparatus in accordance with claim 8, wherein said unsharp signal is produced in an analog circuit, said averaging area corresponds to an aperture for transmitting light to be converted into said unsharp signal, and the size of said aperture is substantially variable.

10. An apparatus in accordance with claim 8, wherein said unsharp signal is produced in a digital circuit on the basis of said sharp signal, said averaging area is formed as a pixel matrix, and the size of said pixel matrix is variable.

* * * * *